Sept. 24, 1963 D. E. STEVENSON 3,105,162
ELECTROMAGNET MOTOR WITH CRANKSHAFT DRIVE
Filed June 29, 1959 2 Sheets-Sheet 1
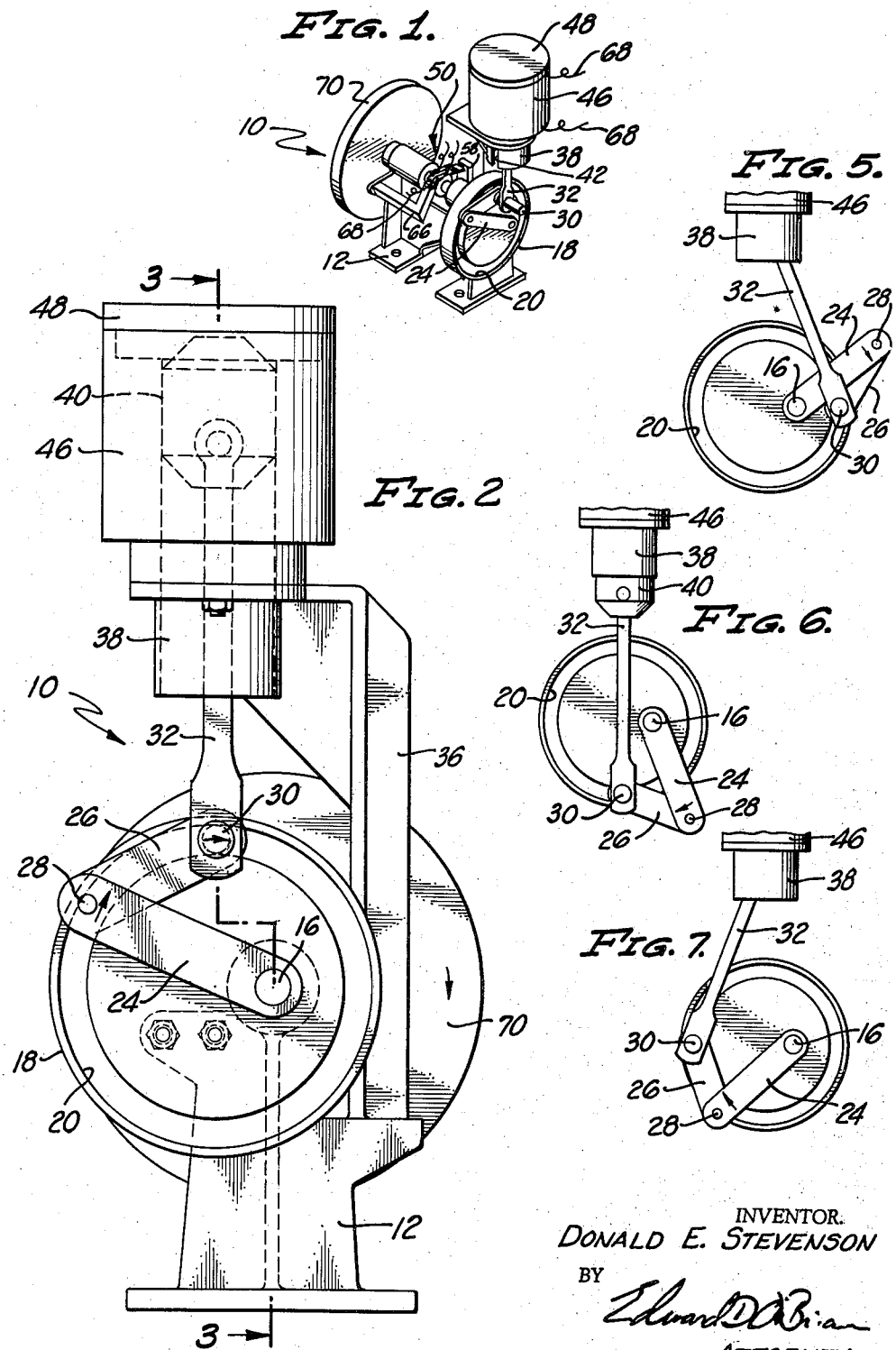
INVENTOR.
DONALD E. STEVENSON
BY
ATTORNEY Sept. 24, 1963  D. E. STEVENSON  3,105,162
ELECTROMAGNET MOTOR WITH CRANKSHAFT DRIVE
Filed June 29, 1959  2 Sheets-Sheet 2
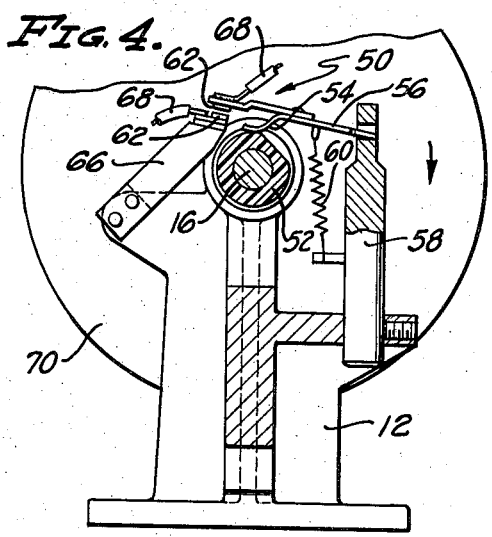
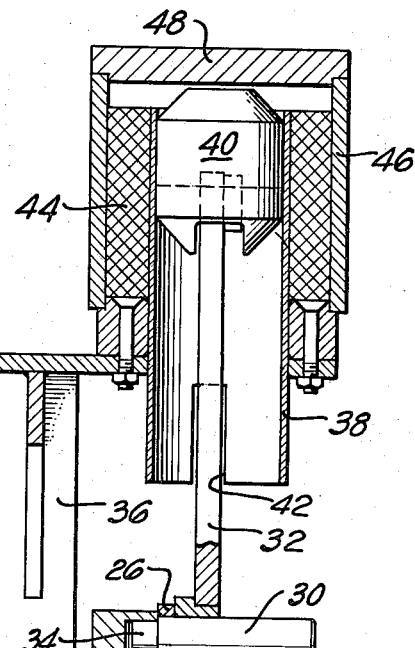
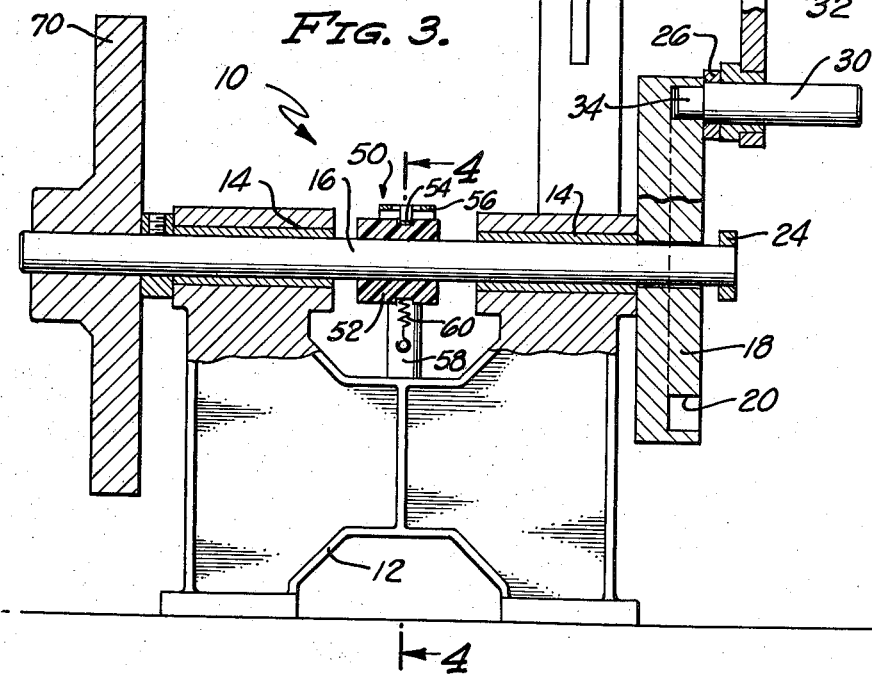
INVENTOR.
DONALD E. STEVENSON
BY
ATTORNEY

United States Patent Office 3,105,162
Patented Sept. 24, 1963

3,105,162
ELECTROMAGNET MOTOR WITH
CRANKSHAFT DRIVE
Donald E. Stevenson, P.O. Box 243, Anza, Calif.
Filed June 29, 1959, Ser. No. 823,627
1 Claim. (Cl. 310—23)

This invention pertains to motors which are primarily intended for use as educational devices in illustrating certain elementary laws and principles of physics, but which are also capable of being used for conventional utilitarian purposes.

The average student in elementary physics has a great deal of difficulty in understanding a number of different elementary laws and principles such as, for example, the laws pertaining to leverage and the like. Further, the average student has a great deal of difficulty in coordinating various information data from one branch of the subject of physics with other information from other branches of the same subject. To a large extent this is because conventional physics courses are broken down for teaching purposes into a separate study of mechanics, a separate study of electricity, etc.

As a result of this there is a definite need to provide devices which can be used so as to clearly illustrate to students the fact that various aspects of the subject of physics are in practice normally involved in any machine. There is also a need for devices capable of being used to illustrate to students principles of elementary mechanics, and other fields of the broad subject of physics.

An object of the present invention is to supply these needs. Thus, an object of the present invention is to provide simple motors which illustrate certain elementary principles with respect to the laws of leverage and rotation. Another object of this invention is to provide motors which indicate how various laws and principles such as laws and principles of electricity are in practice used in conjunction with principles of mechanics, such as principles of leverage.

An object of this invention is also, however, to provide simple, easily constructed and repaired, inexpensive electrical motors which can be used for utilitarian purposes. Another object of this invention is also to provide a new type of cam action used in relating rotary motion to reciprocal motion.

These and other objects of this invention including many advantages of it will be fully apparent to those skilled in the art to which this invention pertains from a detailed consideration of the remainder of this description including the appended claim and accompanying drawings in which:

FIG. 1 is a perspective view of an electrical motor of this invention;

FIG. 2 is an end elevational view of this motor;

FIG. 3 is a cross-sectional view taken at line 3—3 of FIG. 2 of the drawing;

FIG. 4 is a cross-sectional view taken at line 4—4 of FIG. 3 of the drawings; and FIGS. 5, 6 and 7 are diagrammatic views indicating the relative positions of various parts of this motor at certain stages or points during its operation.

The accompanying drawings are primarily intended so as to clearly illustrate a presently preferred embodiment or form of this invention. Those skilled in the art to which this invention pertains will realize however, that minor improvements in this embodiment of the invention may be easily and conveniently made in adapting this motor shown for manufacture through the use of routine engineering skill. Because of this, this invention is to be considered as being limited only by the appended claim forming a part of this disclosure.

As an aid to understanding this invention it may be stated in essentially summary form that it concerns motors which may be used for educational and utilitarian purposes, each of which motors includes a cam track mounted eccentrically around a shaft which carries a crank arm. Each of these motors also includes a reciprocal member which, if desired, may be termed a piston. From such a member there extends a piston rod carrying a cam follower engaging the cam track and carrying a link which is rotatably attached to both the piston and to the end of the crank arm employed.

The actual nature of this invention is best more fully explained by referring directly to the accompanying drawings in which there is shown a complete motor 10 of the present invention. This motor 10 includes a base 12 which may be of any convenient design. This base carries aligned bearings 14 which rotatably support a shaft 16 so that the ends of this shaft are exposed. The base 12 also carries a plate 18 on the surface of which there is formed a circular groove 20 which is located eccentrically to the axis of the shaft 16. During the operation of the motor 10 this groove 20 serves as a cam groove.

The groove 20 faces generally an end of the shaft 16 which carries a crank arm 24 secured to the shaft 16 so as to rotate therewith. The end of the arm 24 remote from the shaft 16 is pivotally secured to a link 26 by means of a pin 28. The end of the link 26 remote from the arm 24 is secured by means of another pin 30 to an end of a piston rod 32. The pin 30 is preferably formed so as to include a cylindrical extension 34 (FIG. 3) serving as a cam follower. This extension 34 thus fits within the groove 20 so as to cause rotation of the portion of the piston rod 32 adjacent to it in a path corresponding to the configuration of the groove 20.

Upon the base 12 there is mounted through the use of a bracket 36 a small tubular cylinder 38 which is preferably formed of a non-magnetic material, such as aluminum, various types of thermoplastic resins or the like. The axis of this cylinder 38 is at a right angle to the axis of the center of the groove 20; thus, it is located at one side of the axis of the shaft 16. This cylinder carries within its interior a piston 40 which is pivotally secured in a conventional manner to the end of the piston rod 32 remote from the pin 30. Slots 42 are provided in the cylinder 38 so as to accommodate motion of the piston rod 32 as the piston 40 reciprocates within the cylinder 38 and as this piston rod moves with respect to the groove 20.

In the preferred embodiment of the motor 10 shown the piston 40 takes the shape of a common solenoid plunger which is caused to be pulled toward the top of the cylinder 38 through the use of a solenoid coil 44 mounted around the cylinder 38 within a housing 46 of a conventional type used with a solenoid. Thus, the housing 46 includes an end cap 48 designed to cover the exposed end of the cylinder 38 remote from the shaft 16. This solenoid coil 44 is designed so as to be periodically actuated in order to exert a pull upon the piston or plunger 40 through the use of switch means 50, the construction of which is best seen in FIGS. 3 and 4 of the drawings.

In the embodiment of the present invention illustrated the switch means 50 includes a non-conductive cam wheel 52 secured to the shaft 16 so as to rotate therewith. Upon the wheel 52 there rides a follower 54 secured to a switch arm 56 which is pivotally mounted upon an extension 58 of the base 12. Preferably the arm 56 is resiliently biased toward the cam wheel 52 through the use of a small coil spring 60. This arm 56 carries contacts 62 which are adapted to mate with corresponding contacts 64 upon a non-conductive bracket 66 mounted upon the base 12. Wires 68 are, of course, used so as to supply current to the contacts 62 and 64 and so as to connect them to the coil 44 and to an appropriate source of D.C. current (not shown) such as a common battery.

Obviously the switch means 50 used with the present invention can take a variety of forms. This switch means is intended so as to periodically supply current to the coil 44 so as to move the piston or plunger 40 toward the top of this coil at certain points during the rotation of the shaft 16 as hereinafter described. In order to sustain movement of this shaft 16 when no power is being applied to the coil 44 it is preferred to locate upon the shaft 16 a conventional fly wheel 70. If desired, this fly wheel 70 can take the form of a pulley for taking the power off of the shaft 16 or a separate pulley can be mounted upon this shaft.

The operation of the motor 10 is relatively simple. When the coil 44 has been supplied with current through the switch means 50 so as to pull the piston or plunger 40 to the top of the cylinder 38 this piston 40 is located in the position indicated in FIG. 2 of the drawings. The cam wheel 52 is preferably dimensioned so as to open the contacts 62 and 64 in the switch means removing all power from the coil 44 when the piston or plunger is a short distance from this upper position. When the power is cut off from the coil 44 the inherent inertia of the system involved in the motor 10, and in particular the inertia of the fly wheel 70 if such a fly wheel is used with the motor 10, will cause the shaft 16 to rotate, pulling the piston 40 from its uppermost position as shown in FIG. 2 and then downward through the position indicated in FIG. 5 of the drawings slightly past the position indicated in FIG. 6 of the drawings. Gravity will also aid this movement. During such rotation the effective lever arm between the end of the piston rod 32 and the axis of the shaft 16 will change slightly, but at all times will be of comparatively small length. This result is accomplished because very little power is required at this stage during the operation of the motor 10.

When, however, the piston 40 gets slightly past the position shown in FIG. 6 of the drawings at the low point of the travel of this piston the effective lever arm serving to rotate the shaft 16 will gradually increase reaching a maximum in the position indicated in FIG. 7 of the drawings. During rotation of the shaft from slightly beyond the position shown in FIG. 6 to slightly before the position shown in FIG. 2 of the drawings the cam wheel 52 will cause the switch means 50 to be actuated so as to supply power to the coil 44, lifting the piston 40 within the cylinder 38. During such lifting a comparatively large lever arm between the axis of the shaft 16 and the axis of the pin 30 and the extension 34 is needed since more power is required at this stage of the operation of the motor 10 than is required when the piston 40 is going in a downward direction.

Thus, with the motor 10 in effect a variable crank arm is achieved. The mechanism used in this variable crank arm clearly and distinctly illustrates elementary principles of leverage as well as the operation of a cam and a mechanical linkage. Further, the use of this mechanism in conjunction with the coil 44 and the piston 40 constituting a solenoid illustrates an interconnection between the subject matters normally taught in separate and in substantially unrelated parts of elementary physics courses. The use of a switch such as a switch means 50 further aids in this respect.

In spite of the teaching character of motors of this invention they are, however, of a utilitarian nature and power can be taken from them as through the use of the fly wheel 70 as a pulley or by other means. Such power can be measured in order to teach other aspects of a simple engineering nature.

Those skilled in the art to which this invention pertains will realize that motors such as the motor 10 are very efficient for the purpose intended. They will also realize that the particular type of cam structure herein described is very efficient for converting linear motion, such as is employed with the piston 40 to a rotary motion wherever a variable lever arm is desired or required. They will also realize, of course, that this same cam linkage can be used to convert rotary motion into reciprocal linear motion wherever required. The basic features or principles of this invention can be applied to other similarly appearing motors using other means, such as a hydraulic cylinder or the like instead of a solenoid so as to create reciprocal linear motion by appropriate adaption of the motor 10 through the application of routine engineering principles. Because of these factors this invention is to be considered as being limited only by the appended claim forming a part of this disclosure.

I claim:

A motor which includes: base means; bearing means mounted upon said base means in a horizontal position; a shaft rotatably held by said bearing means so as to have an end spaced from said bearing means; a plate mounted upon said base means, said plate having a circular groove formed therein, said groove extending around said shaft adjacent to said end of said shaft and being located eccentrically with respect to said shaft; a crank arm attached to said end of said shaft so as to extend therefrom, said crank arm being capable of rotating with said shaft; a vertically extending non-magnetic cylinder mounted on said base means adjacent to said plate, the axis of said cylinder being aligned with the center of said circular cam groove; a solenoid plunger slidably mounted within said cylinder; a piston rod pivotally attached to said plunger so as to extend therefrom to adjacent to said cam track; a link having ends, one of said ends of said link being pivotally attached to an end of said crank arm remote from said shaft, the other of said ends of said link being pivotally attached to an end of said piston rod remote from said plunger; cam follower means attached to said end of said piston rod remote from said plunger, said cam follower means engaging said cam groove so as to be capable of movement around said cam groove; a solenoid coil located around said cylinder adjacent to said plunger; switch means mounted on said base adjacent to said shaft, said switch means including means attached to said shaft so as to periodically actuate said switch means during rotation of said shaft so as to supply power to said solenoid coil through said switch means; conductor means connecting said switch means with said solenoid coil.

References Cited in the file of this patent

UNITED STATES PATENTS

| | | |
|---|---|---|
| 251,560 | Elbing | Dec. 27, 1881 |
| 474,557 | Harris | May 10, 1892 |
| 1,721,447 | Haney | July 16, 1929 |
| 2,687,649 | Seragnoli | Aug. 31, 1954 |